Aug. 24, 1965  M. BOGAARDT ETAL  3,202,584
PRESSURIZED WATER REACTOR PLANT WITH IMPROVED
JET PUMP ARRANGEMENT
Filed Jan. 23, 1962                                    2 Sheets-Sheet 2

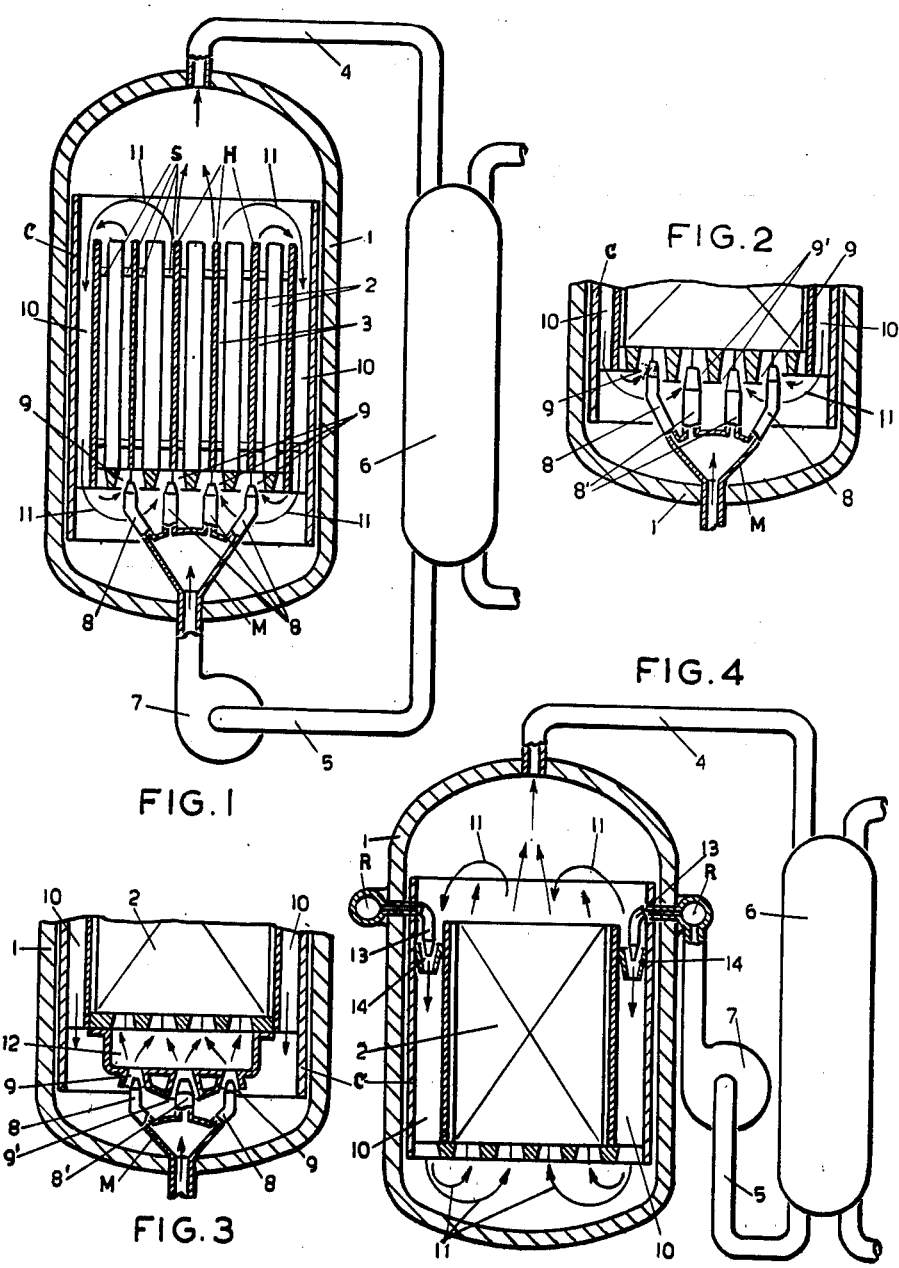

United States Patent Office 3,202,584
Patented Aug. 24, 1965

3,202,584
PRESSURIZED WATER REACTOR PLANT WITH IMPROVED JET PUMP ARRANGEMENT
Maarten Bogaardt, The Hague, Wouter G. Bonsel and Matthijs Muysken, Scheveningen, and Wilhelmus W. Nijs, Rijswijk, Netherlands, and Abraham Bahbout, Brussels, Belgium, assignors to Reactor Centrum Nederland, The Hague, Netherlands, an institute of the Netherlands
Filed Jan. 23, 1962, Ser. No. 168,156
Claims priority, application Netherlands, Jan. 26, 1961, 260,537
11 Claims. (Cl. 176—61)

This invention relates to fluid circulation apparatus and methods.

The invention is particularly concerned with pressurized water reactor plants of the type comprising a closed circuit which is completely filled with water under pressure acting both as a coolant and as a moderator, a casing containing a plurality of spaced substantially vertical elongated fuel elements, which together constitute the core of a nuclear reactor, a heat exchanger for the transfer of the useful heat produced in said core, said casing and said heat exchanger forming part of said closed circuit, and means for forcing water through said circuit and in vertical direction through passages defined between said fuel elements.

In conventional plants of the type provided with a pressurized water reactor, the amount of water flowing in a given time through the reactor core is equal to that flowing in an equal time through an associated outer circuit provided with a heat exchanger. Since the maximum allowable temperature of the water in the core is limited by the possible occurrence of local burning of the reactor parts, each core structure requires a predetermined minimum water current through the core. The more compact a core is and the more heat thus produced per unit of volume thereof, the more water will have to flow per unit of time through the core and also through the outer part of the circuit. This requires a strong pump for the circulation of the water and decreases the thermal efficiency of the plant. The decrease of this efficiency may be somewhat reduced by making the conduits of the outer circuit and the total passage of the associated heat exchanger of large cross-section. Thus it appears that a reduction of the size of a reactor must be coupled with an enlargement of the outer part of the plant and with the provision of a high pressure for water flow. This in turn results in a considerably more expensive requirement for material and equipment.

Another disadvantage of known pressurized water reactor plants is that, when the pump stops, the water in the core comes to a stand still and is then locally heated so intensely that steam is produced and the core may locally melt.

An object of the invention is to provide a pressurized water reactor plant, which has not only the advantages to be described hereafter but which may also be made very compact with a relatively high thermal efficiency.

It is a further object of the invention to provide an improved pressurized water reactor plant which is adapted to propel vessels.

A further object of the invention is to provide improved methods relating to fluid circulation in pressure fluid circulation systems.

According to one embodiment of the invention, a jet pump is provided in a casing, there being a jet tube which forms part of the associated circuit and which is directed in such manner as to force water towards the water inlet end of the associated core. The suction opening of said pump is arranged so as to draw water from the water outlet end of the core, the arrangement being such as to allow a part of the flow of water passing through the core to be forced by said jet pump through a second circuit which is entirely inside the casing. The arrangement further is such as to keep, at full load of the reactor, that means at the allowable maximum continuous load, the ratio between the quantity of water passing per unit of time through the core from its inlet to its outlet and the quantity of water flowing per unit of time through the circuit outside the casing between 1.5 and 4.

In such a plant only a portion of the cooling water flowing through the core is forced through the outer part of the first circuit. This makes is possible to decrease considerably the size of said outer part and moreover to use a pump of smaller power. The reduction of the size of the outer circuit also saves expensive heavy water if this is used as a coolant. Further there is more freedom with respect to the design of the core and that of the outer circuit and it is also possible to increase the flow of water through the core without the necessity of increasing the flow of water through the outer part of the circuit in which there are greater losses.

It has been found that the thermal efficiency is optimal at a value of the ratio between the flow of water through the core and that through the outer part of the first circuit lying between 1.5 and 4. Above 4 either the velocity of the current of water through the core is too high, which results in too heavy losses due to the resistance, or the flow of water through the outer part of the circuit is too small, which requires too great a cooling of the water in the heat exchanger, whereby unallowable thermal stresses may be set up and the efficiency is unfavorably affected. Below 1.5 the gain obtained by the measures recommended in accordance with the invention is not compensated any more by the more complicated construction of the plants.

The increase of the amount of water forced per unit of time through the core has firstly the advantage that the unfavorable effect of the irregular heat production in the core, owing to which the average temperature of the water leaving the core is considerably lower than the maximum temperature allowed at a given velocity of the water, is reduced so that the water is allowed to leave the core with a higher mean temperature. Secondly, the maximum temperature of the water in the core may be higher, since the danger of burning in the hottest zones appears to be less when the water passing through the core has a greater velocity. Another advantage of plants constructed in accordance with the invention is that the jet pump or set of jet pumps operating in parallel does not form an obstacle for the second circuit within the casing so that, when the main pump for driving the water fails or serious leakage occurs, the water in the core will not come to a stand still but continues to flow due to the thermosiphon action in the inner circuit. That is why the danger of localized melting of the core is considerably reduced. Moreover, jet pumps do not have moving parts, which may lead to stagnation. Finally, the regulation of the plant by the control of the inner circuit is more sensitive so that a better stabilization of the operation of the core is possible.

The reactor may be advantageously so constructed as to permit the inner second circuit to be closed outside the core. This makes it possible reducing the size of the core and providing a large return path for the water without the necessity of making the casing inefficiently big. Also, a better control of the temperature of said water is thereby possible.

In order to obtain a better mixing and distribution of the cooler water from the outer part of the first circuit, after it has entered the casing, and the hotter water circulating within the casing, a mixing compartment may be provided in the casing in front of the inlet end of the core, which mixing compartment communicates with a plurality of cooling and moderating passages of the core, and at least one jet pump may be mounted in the wall of said compartment. The distribution of the water over the various passages of the core may be improved by providing in the wall of said mixing compartment two or more jet pumps operating in parallel and opening in said compartment.

The position and/or the capacity of each of the jet pumps may be so chosen as to result in the correlation of the local intensity of the flow of water passing through the core to the local power density of the core.

Instead of being positioned immediately or by means of the mixing compartment in front of the inlet end of the core the jet pump or the set of jet pumps operating in parallel may be accommodated in the space which with respect to the axis of the core is provided in the casing radially at the side of the core. A greater freedom of control of the two circuits may be obtained when the jet tube of the or each jet pump is connected to a branch of the part of the cirst circuit outside the casing. In said branch, an automatically controllable choke member may be provided, of which the aperture is controlled in dependence on the drop of pressure along the core or on the variation per unit of time of said pressure drop. It is also possible to connect two or more jet pumps, or two or more sets of jet pumps operating in parallel, in series, the jet tubes of which pumps are connected to parallel branches of the part of the first circuit outside the casing.

When at the side of the core but inside the casing a free space containing jet pumps is used for closing the inner second circuit, the casing may advantageously be shaped as a sphere or an ellipsoid in order to obtain a whirl of natural form. Such a shape of the casing increases both the resistance to pressure and the insulation thereof. If the core is also shaped as a sphere or an ellipsoid, the fuel elements may extend in concentric hyperboloids of revolution in order to improve the water circulation within the casing. In that case the elements and the passages may be straight if they are positioned in the generatrices of said curved surfaces.

Regarding the use of jet pumps to obtain second circuits entirely within the casings of the boiling water type of nuclear reactor, the inner circuits thereof are used for the control of the energy generated by the associated cores and depend on the moderating operation, or in other words on the water-steam ratio, of the coolant in the cores. This second circuit is not meant for an increase of thermal efficiency or for maintaining said efficiency when the dimensions of the plant are reduced. In known boiling water reactor plants, the ratio between the quantity of water forced through the core and the quantity of steam flowing through the outer circuit must be much more than 4 to have a reasonable effect and to enable the control aimed at within a large range.

The invention will be elucidated with the aid of the accompanying drawing which illustrates various embodiments of a pressurized water reactor plant. In the drawings:

FIG. 1 is a partly vertical sectional view, partly elevational view of a pressurized water reactor plant according to the invention;

FIG. 2 is a vertical sectional view of a variant of a portion of the reactor shown in FIG. 1;

FIG. 3 is a vertical sectional view of a second variant of a portion of the reactor illustrated in FIG. 1;

FIG. 4 is partly a vertical sectional view, partly an elevational view of a portion of a pressurized water reactor plant which is provided with another reactor;

Figure 5:
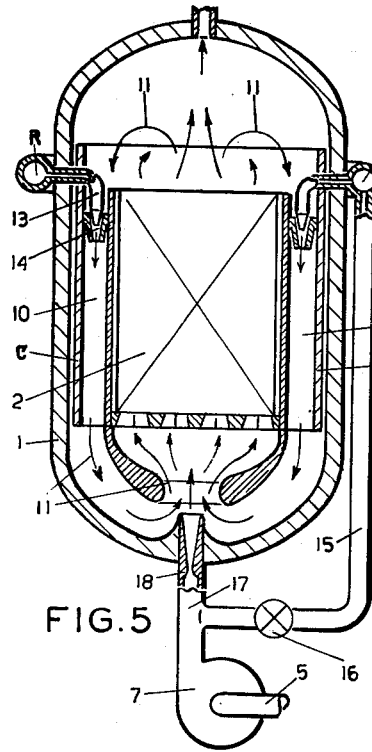
FIG. 5 is a vertical sectional view of a variant of the reactor shown in FIG. 4.

In FIG. 1, a pressure resisting casing 1 contains a reactive core consisting of vertical fuel elements 2. These fuel elements are spaced from one another and placed in tube-like cells of a honeycomb structure H, which is open at both ends. Said elements are spaced from the walls of said cells and kept erect by studs S so that passages 3 for the moderating cooling water are formed therebetween and the core may be considered as a water permeable structure.

The casing forms part of a water circuit having an outer portion consisting of conduits 4 and 5, a heat exchanger 6 and a pump 7. The casing and the remaining part of the circuit are filled with water under high pressure.

The pump forces the water upwards through the core 2. Within the casing, the jet tubes 8 on manifold M of a set of jet pumps operating in parallel are provided in the said circuit. The suction openings 9 of said jet pumps are in open communication with the space 10 contained in the casing radially outwards of and at the side of the core and with the upper or outlet end of the core through said space.

Figure 8:
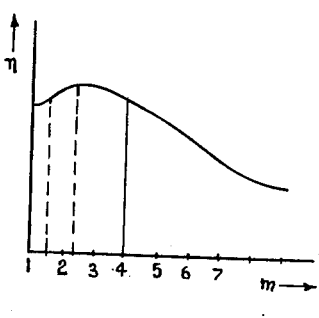
FIG. 8 is a graph showing dependence of the thermal effect of the plant on the circulation ratio of the water.

During operation, the jet pumps force the water along a second circuit indicated by arrows 11 and entirely contained within the casing and particularly within the cylindrical member C which may be included by said casing. Consequently, the quantity of water flowing per unit of time through the passage 3 of the core is greater than the quantity of water which is forced per unit of time through the outer circuit including elements 4, 6, 5 and 7. The ratio $m$ between the two quantities must lie between 1.5 and 4 in order to obtain an optimal thermal effect $n$ of the plant. If the thermal efficiency $n$ of a plant according to the invention is plotted against the circulation ratio, that means the ratio $m$ between the intensity of the water current through the core and that through the outer circuit, a graph is obtained as shown in FIG. 8. From this graph it appears that the optimum lies between the value 1.5 and 4 of the above-mentioned ratio.

The variant illustrated in FIG. 2 differs from that according to FIG. 1 in that the inner jet pumps 8', 9' have a greater capacity than the outer jet pumps 8, 9. Due to this, the current of water through the portion of the core where the heat production is greatest will be greater than that passing through the remaining part of the core. As a consequence thereof, the current of water through the core will be better adjusted to the local power intensity of the core.

In FIGS. 1 and 2, the jet pumps 8, 9 and 8', 9' are mounted immediately in front of the inlet ends of the passages 3. However, it may be important to improve the mixing of the colder water supplied by the pump 7 with the hotter water of the second circuit 11 before it enters the core. To this end, a mixing compartment 12, into which the jet pumps 8, 9 and 8', 9' open, is provided in front of the inlet end of the core (see FIG. 3). In this case, there is more freedom as to the selection of the number and the position of the jet pumps than with the embodiments shown in FIGS. 1 and 2. Such pumps need not be mounted directly in front of the cooling passage of the core.

In FIG. 4 a plurality of jet pumps 13, 14 operating in parallel are provided in the space 10 at the side of the core and in the neighborhood of the upper end thereof. An annular ring conduit R couples said jet pumps to pump 7. The advantages of this arrangement of the jet pumps are that a large mixing space is automatically obtained, the height of the reactor may be reduced and the water leaving the core may be more readily drawn away.

In the embodiments shown in FIGS. 1-4, it is somewhat difficult to control the inner and the outer circuit separately, since to that end the jet tubes of the jet pumps must be mounted for adjustment with respect to their suction openings. To improve this situation, the jet pumps 13, 14 of the plant illustrated in FIG. 5 are connected to a branch 15 of the outer circuit which is directly connected to the lower end of the casing 1. Provided in said branch 15 is a controllable valve or an adjustable choke member 16, by means of which the jet pumps 13, 14 may be controlled. Moreover, the conduit 17 of the outer circuit, which is directly connected to the casing, has a gradually narrowing portion followed by a widening portion, in such a manner, that said conduit ends as a venturi-tube. Due to this construction a suction force is exerted on the inner circuit. It will be obvious that the member 16 makes it possible to control the jet pumps independently from the water current flowing in the outer circuit.

Figure 6:
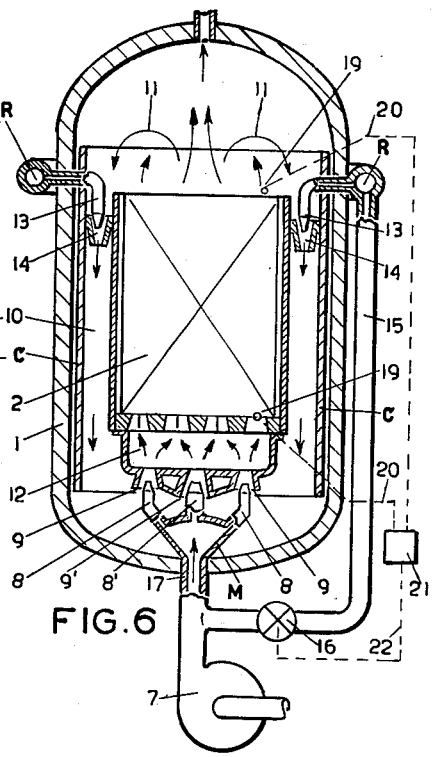
FIG. 6 is a vertical sectional view of a reactor comprising a combination of parts of the reactors illustrated in FIGS. 3 and 5 and provided with an automatic controlling device.

In the embodiment shown in FIG. 6, the mixing compartment 12 and the jet pumps 8, 9 and 8', 9' connected to the conduit 17 are provided, in the manner shown in FIG. 3, in front of the inlet end of the core and the jet pumps 13, 14 are positioned, in the manner illustrated in FIG. 5, at the side of the core. In this case the jet tubes 8, 8' and 13 are connected to the parallel branches 17 and 15 of the outer portion of the circuit and the jet pumps 8, 9 and 8', 9' on the one hand and the jet pumps 13, 14 on the other hand are connected in series with respect to the inner circuit 11 of the water. In this manner, it is easy to make the water current of the inner circuit considerably stronger than that which flows through the circuit outside the reactor casing. Also, in this case, the choke member 16 is provided in the branch 15. The passage area of said member is controlled in dependence on the absolute value or on the variation of the pressure drop in the core. To that end, pressure sensitive pick-ups 19 are mounted both in the neighborhood of the inlet and in that of the outlet end of the core and are connected through conduits 20 with a measuring instrument 21 reacting on pressure differences or on pressure variations and controlling through a connection 22 the choke member 16.

Figure 7:
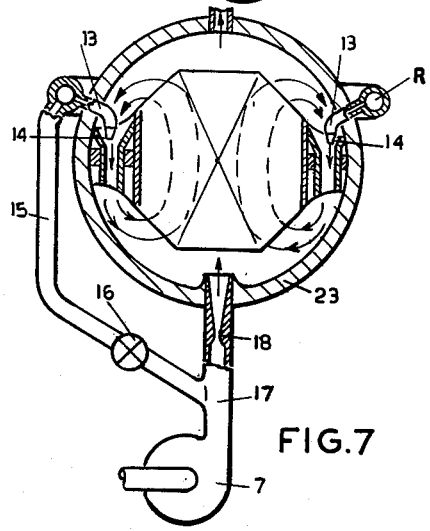
FIG. 7 is a vertical sectional view of a spherical reactor.

FIG. 7 shows a variant of the plant illustrated in FIG. 5. Therein the reactor is constructed as compactly as possible, to which end the casing 23 is made spherical and the shape of the core approximates that of a sphere. The spherical shape has, in addition to the advantage of a greater resistance to pressure and a smaller heat radiation, the favorable effect that in the equator thereof a larger space for the accommodation of the jet pumps is automatically obtained and the inner water circuit approximates the shape of the natural toroidal whirl. In this embodiment the fuel elements and the cooling passages may extend in concentric hyperboloids of revolution. If said elements and passages are positioned in the direction of the straight generatrices of said curved surfaces they may also be straight.

What is claimed is:

1. A pressurized water reactor plant comprising a vertical casing, a plurality of vertical elongated fuel elements in said casing constituting a nuclear reactor core, means supporting said fuel elements in spaced relation to define a plurality of substantially vertical passages, a heat exchanger, conduits interconnecting said casing and said heat exchanger to form a closed circuit, said circuit being completely filled with water acting both as a coolant and as a moderator, a main pump in one of said conduits having a pressure outlet and a suction inlet and adapted to circulate water through said closed circuit, said core having a lower inlet end and an upper outlet end and defining together with the casing an upper space, a lower space and a space surrounding said core and interconnecting said upper space and said lower space outside the core and inside said casing, and a jet pump disposed in said space surrounding the core, said jet pump including a jet tube connected to the pressure outlet of said main pump, the jet pump having a suction inlet directed towards the upper space in the casing into which the outlet end of the core opens, the jet pump having a pressure outlet directed towards the lower space in the casing to which the inlet end of the core is in communication.

2. A pressurized water reactor plant as claimed in claim 1, in which said jet pump is disposed adjacent the outlet end of the core in the space surrounding the core and contained in the casing.

3. A pressurized water reactor plant as claimed in claim 1, comprising a second jet pump, the latter pump being disposed in the lower space of the casing below the inlet end of the core, said second jet pump including a jet tube, which is also connected to the pressure outlet of the main pump, the pressure side of the second jet pump being directed towards the inlet end of the core and the suction side of said second jet pump communicating through the lower space of the casing with the space thereof surrounding the core and containing each first jet pump.

4. A pressurized water reactor plant as claimed in claim 3, comprising flow control means in the conduit extending from the pressure side of the main pump to the jet tube of the first jet pump and automatic control means operatively coupled to said flow control means, said automatic control means being responsive to water pressure drop along the core of the nuclear reactor.

5. A pressurized water reactor plant as claimed in claim 3, comprising flow control means in the conduit extending from the pressure side of the main pump to the jet tube of each first jet pump and automatic control means operatively coupled to said flow control means, said automatic control means being responsive to variation per unit of time of water pressure drop along said core.

6. A pressurized water reactor plant as claimed in claim 1, comprising a plurality of jet pumps including the first said pump in the space of the casing surrounding the core, a common manifold for said jet pumps, said jet pumps operating in parallel and the jet tubes of said jet pumps being connected to said common manifold which is connected to the pressure side of the main pump.

7. A pressurized water reactor plant as claimed in claim 1, in which the casing has a spherical shape, the fuel elements constituting the nuclear reactor core being straight elements which define a periphery constituting axial hyperboloid surfaces of revolution that substantially conform with the shape of said casing, said surfaces of revolution having an axis which coincides with the vertical axis of the casing.

8. A pressurized water reactor plant as claimed in claim 1, in which the casing has an ellipsoid shape, the fuel elements constituting the nuclear reactor core being straight elements which define a periphery constituting coaxial hyperboloid surfaces of revolution that substantially conform with the shape of said casing, said surfaces of revolution having an axis which coincides with the vertical axis of the casing.

9. A method of operating a pressurized water reactor which has a vertical casing and a liquid permeable vertical nuclear reactor core in the casing defining a lower inlet space, an upper outlet space, and a space surrounding the core providing communication between the upper space and the lower space, said method comprising circulating a cooling liquid through the casing and externally thereof through a closed circuit in which heat is absorbed by the cooling liquid in the reactor core while heat is extracted from the cooling liquid externally of the casing, a portion of the cooling liquid being forceably recirculated in the casing along a path extending downwardly from the upper space to the lower space through said space surrounding the core and then upwardly through said core again and back to the upper space to maintain a ratio between the quantity of cooling liquid passing per unit time through the core and the quantity of cooling liquid passing per unit time through the casing at between 1.5 and 4.

10. A method of operating a pressurized water reactor which has a vertical casing and a liquid permeable vertical nuclear reactor core in the casing defining a lower inlet space, an upper outlet space, and a space surrounding the core and providing communication between the upper space and the lower space, said method comprising circulating a cooling liquid along a closed circuit including the casing, the liquid absorbing heat from the reactor core and transferring the heat externally of the casing as the liquid completes a passage through said circuit, dividing the liquid inflow to the casing to cause liquid to directly flow into said casing upwardly through the core from the inlet space to the outlet space while concurrently causing liquid to flow downwardly in the space surrounding the casing from a zone adjacent the upper space to the lower space and thence upwardly through the core, recirculating the liquid within said casing along a path extending from the upper space to the lower space through the space surrounding the casing and then upwardly through the core back to the upper space to maintain a ratio between the quantity of liquid passing per unit time through the core and the quantity of liquid passing per unit time through the casing at between 1.5 and 4.

11. A method as claimed in claim 10 wherein the portion of the liquid which is introduced in the space surrounding the casing is injected into said space under turbulent conditions.

References Cited by the Examiner

UNITED STATES PATENTS

| | | | |
|---|---|---|---|
| 1,625,592 | 4/27 | Conant et al. | 137—563 |
| 2,582,802 | 1/52 | Terrell | 137—563 |
| 2,861,033 | 11/58 | Treshow | 176—56 |
| 2,946,732 | 7/60 | Wooton | 176—31 |
| 2,957,815 | 10/60 | Pacault et al. | 60—108 |
| 3,098,812 | 7/63 | Treshow | 176—56 |
| 3,108,937 | 10/63 | Kumpf et al. | 176—61 |

FOREIGN PATENTS

| | | |
|---|---|---|
| 199,766 | 9/58 | Austria. |
| 1,021,515 | 12/57 | Germany. |
| 792,171 | 3/58 | Great Britain. |
| 796,966 | 6/58 | Great Britain. |

REUBEN EPSTEIN, *Acting Primary Examiner.*

CARL D. QUARFORTH, *Examiner.*